United States Patent Office 3,787,520
Patented Jan. 22, 1974

3,787,520
POWDERED COATING COMPOSITIONS CONTAINING A GLYCIDYL ESTER COPOLYMER, A PHENOLIC HYDROXY CROSSLINKING AGENT, AND A FLOW CONTROL AGENT
Santokh S. Labana, Dearborn Heights, and Ares N. Theodore, Farmington, Mich., assignors to Ford Motor Company, Dearborn, Mich.
No Drawing. Filed Aug. 16, 1971, Ser. No. 172,225
Int. Cl. C08g 45/04
U.S. Cl. 260—836                          22 Claims

ABSTRACT OF THE DISCLOSURE

Powder coating compositions are disclosed. In general, individual powder coating compositions are a mixture of the following materials. A copolymer of glycidyl methacrylate and an ethylenically unsaturated compound is formed in such proportions as to obtain a copolymer with a glass transition temperature in the range of 40° C. to 90° C. and a molecular weight ($\overline{M}_n$) in the range of 2500 to 8500. The glycidyl methacrylate is present in the copolymer from at least about 8% by weight to no more than about 30% by weight. Another material of the coating composition is a cross linking agent formed of a phenolic hydroxy terminated resin present in the amount of 0.8 to 1.1 phenolic hydroxy groups for each epoxy group in the copolymer. A third material used in forming the powder coating mixture is a flow control agent which forms at least 0.05% by weight of the mixture. The flow control agent is a polymer having a molecular weight ($\overline{M}_n$) of at least 1000. The flow control agent also has, at the baking temperature of the powder coating composition, a lower surface tension than the surface tension of the copolymer.

BACKGROUND OF THE INVENTION

Powder coating compositions for use in the painting of surfaces are extremely desirable. Such coating compositions are desirable because they eliminate the solvents utilized in liquid paint systems as, for example, the paint system shown in U.S. Pat. 2,857,354, issued Oct. 21, 1958. A powder coating paint composition is curable by heat in a manner that little, if any, volatile material is given off to the surrounding environment. This is substantially different from a liquid paint system as the liquid paint vehicle must be volatilized during the drying of the paint. Volatilization of the liquid vehicle carries such vaporized material into the surrounding ambient.

This invention is directed to powder coating compositions which are suitable for finishing surfaces of articles with a protective and decorative coating. The coatings produced by the compositions of this invention are comparable in their usefulness to the coating produced by the prior art liquid paint systems. The liquid paint system disclosed in U.S. Pat. 2,857,354 is apparently similar but, in reality, substantially different than the powder coating compositions of this invention. A full discussion of these differences is set forth in the last portion of this specification.

SUMMARY OF THE INVENTION

This invention is directed to powder coating compositions and, more particularly, to powder coating compositions which are curable by heat, have a good shelf life, are non-caking, are less corrosive to metal equipment, and are usable with metallic aluminum pigment. Coating formed from the powder coating compositions also have a reduced tendency to sublime during baking and can be baked at higher temperatures resulting in short cure time. When properly baked and cured, the coatings from these powders possess good gloss, impact properties and solvent resistance, and have a smoother finish with a reduced amount of craters therein.

A powder coating composition formed in accordance with the teachings of this invention comprises an intimate mixture of several materials. A first material of the mixture is a copolymer of glycidyl methacrylate and an ethylenically unsaturated compound in such proportions as to obtain a copolymer with a glass transition temperature in the range of 40° C. to 90° C. and with a molecular weight ($\overline{M}_n$) in the range of 2500 to 8500. The glycidyl methacrylate is present in the copolymer from at least about 8% by weight to no more than about 30% by weight. Another material of the mixture is a cross linking agent formed of a phenol hydroxy terminated resin in the amount of 0.8 to 1.1 phenol hydroxy groups for each epoxy group in the copolymer. Another material of the mixture is a flow control agent which forms at least 0.05% by weight of the mixture. This flow control agent is a polymer having a molecular weight ($\overline{M}_n$) of at least 1000. The flow control agent also has, at the baking temperature of the powder coating composition, a lower surface tension than the surface tension of the copolymer.

In greater detail, a powder coating composition formed in accordance with the teachings of this invention includes a small weight percent of a catalyst which produces a gel time for the powder coating composition greater than 1 minute at the baking temperature of the composition. The coating composition may also use therein a pigment which forms from about 6% by weight to about 35% by weight of the total mixture depending on the pigment selected and the gloss required for the baked coating. The powder coating composition may also include a small weight percentage of an antistatic agent.

The preferred ranges for individual contents of the materials for the powder coating compositions described above are as follows. The glycidyl methacrylate which forms a portion of the copolymer in the mixture should be present in the copolymer in the range of at least 8% by weight to no more than 30% by weight. A desirable range of glycidyl methacrylate in the copolymer is at least 10% by weight to no more than 25% by weight with the most desirable copolymer containing from at least 12% by weight to no more than 20% by weight of the glycidyl methacrylate. Also, the preferred glass transition temperature for the copolymer is in the range of 50° C. to 80° C. with a molecular weight ($\overline{M}_n$) in the range of 3000 to 6500. The most desirable glass transition temperature for the copolymer is 50° C. to 70° C. with a molecular weight ($\overline{M}_n$) in the range of 3000 to 4000.

With respect to the phenolic hydroxy terminated resin used as the cross linking agent, a phenolic hydroxy terminated polyether is usable in the powder coating composition. Phenolic hydroxy terminated polyethers having a molecular weight in the range of 600 to 3000 are useful. These ethers may be prepared by reacting one equivalent weight of a diepoxy resin having a molecular weight in the range of 250 to 2000 with one and a half to three equivalent weights of a diphenol having a molecular weight in a range from about 110 to about 550.

With respect to the flow control agents used in the powder coating mixture, an individual agent selected for a mixture may be an acrylic polymer having a glass transition temperature below the glass transition temperature of the mixture's copolymer. Preferred acrylic polymers which may be used for the flow control agent are polylauryl acrylate, polybutyl acrylate, poly(2-ethylhexyl acrylate, polylauryl methacrylate and polyisodecyl methacrylate.

The flow control agent may also be a fluorinated polymer having a surface tension, at the baking temperature of the powder, lower than that of the copolymer utilized in the mixture. Preferred flow control agents, if the agent is a fluorinated polymer are esters of polyethyleneglycol or polypropyleneglycol and fluorinated fatty acids. For example, an ester of polyethyleneglycol of molecular weight of over 2500 and perfluoro octanoic acid is a useful flow control agent.

In addition to the glycidyl methacrylate monomer used in all copolymer forming mixtures, other monomers which may be used are methyl methacrylate, butyl methacrylate, butyl acrylate, ethyl acrylate, 2-ethylhexyl acrylate, styrene, alpha methyl styrene, acrylonitrile and methacrylonitrile. The glycidyl methacrylate and the ethylenically unsaturated monomers are mixed and reacted in such proportions as to obtain the copolymer for the powder coating mixture which has a glass transition temperature and a molecular weight as set forth above.

A small weight percentage of a catalyst is added to the powder coating composition in order to increase the cross linking rate of the powder coating composition at the baking temperature thereof. In preference, the catalyst produces a gel time for the powder coating composition of at least 1 minute but no greater than 40 minutes. The preferred catalyst is one which produces a gel time of at least 1 minute but no greater than 10 minutes. In general, the catalyst is present in the range of from 0.05% by weight to 1% by weight of the weight of the mixture. The most desirable gel time produced by the catalyst is in a time range of from about 3 minutes to about 10 minutes. These catalyst gel times are at baking temperatures for the powder coating compositions in the range of 130° C. to 200° C. or more preferably in the temperature range of 140 to 170° C.

The powder coating compositions of this invention may also contain from about 6% by weight to about 35% by weight of a pigment. The various pigments already known in the art may be employed in the powder coating compositions. The pigments are generally selected for color, appearance or corrosion protection properties. Metallic aluminum pigment may also be included to give the baked coating a metallic look.

A small weight percent of an antistatic agent may also be employed in the powder coating composition. For example, 0.05% by weight to 0.5% by weight of the powder coating composition may be an antistatic agent so that the coating may be applied in an electrostatic spraying operation.

DESCRIPTION OF THE PREFERRED EMBODIMENT

A general discussion of the various materials which may be employed in the powder coating compositions of this invention will be set forth below. Also, a plurality of examples will be employed to show the manner in which various, individual, powder coating compositions, which fall within the scope of this invention, are prepared and utilized.

The principal material in individual powder coating compositions is a copolymer formed from glycidyl methacrylate and an ethylenically unsaturated monomer in such proportions as to obtain a copolymer with a glass transition temperature in the range of 40° C. to 90° C. and a molecular weight ($\overline{M}_n$) in the range of 250 to 8500. The ethylenically unsaturated monomer employed to form the copolymer is any one, or a mixture of the many different monomers known to those skilled in the art. In forming the copolymer, the glycidyl methacrylate is present in the final copolymer from at least about 8% by weight to no more than about 30% by weight. The balance of the weight of the copolymer is formed from the ethylenically unsaturated monomers.

The preferred ethylenically unsaturated monomers which are employed to form the copolymer which the glycidyl methacrylate are methyl methacrylate, butyl methacrylate, butyl acrylate, ethyl acrylate, 2-ethylhexyl acrylate. Suitable modifying monomers such as styrene, alpha methyl styrene, acrylonitrile and methacrylonitrile can be used with the preferred monomers. When used, a modifying monomer is present in the copolymer from a weight percent of about 0% by weight to no more than about 35% by weight. Thus, when the preferred ethylenically unsaturated monomers are used with glycidyl methacrylate to form the copolymer, the glycidyl methacrylate is present in the copolymer from 8% by weight to about 30% by weight, the modifying monomer is present from about 0% by weight to no more than about 35% by weight, and the preferred monomer is present from about 92% by weight to about 35% by weight.

In accordance with detailed teachings of this invention, the copolymer for the powder coating composition is formed from glycidyl methacrylate, methyl methacrylate, and butyl methacrylate. In this intsance, the glycidyl methacrylate is present in the copolymer from about 8% by weight to no more than about 30% by weight, the methyl methacrylate is present in the copolymer from about 25% by weight to about 60% by weight, and the balance of the copolymer is butyl methacrylate.

The copolymers of glycidyl methacrylate can be prepared by a variety of methods. Generally, a free radical initiator is needed to induce polymerization reaction. A large number of free radical initiators are known in the art. These include benzoyl peroxide, lauryl peroxide, t-butylhydroxyperoxide, acetylcyclohexane sulfonyl peroxide, diisopropyl peroxydicarbonate, t-butylperoxypivalate, decanoyl peroxide, azobis (2 - methylpropionitrile), etc. The polymerization is preferably carried out in solution using a solvent in which the glycidyl methacrylate copolymer is soluble. Toluene, xylene, dioxane, butanone, etc., are suitable solvents for polymerization. If the glycidyl methacrylate copolymer is prepared in solution, the solid copolymer can be obtained by evaporating the solvent under vacuum or spray drying techniques. Alternatively, the copolymer can be precipitated by pouring the solution at a slow rate into a non-solvent liquid such as hexane, octane or water under a suitable agitation condition at a slow rate. The copolymer thus obtained should be further dried so that it contains less than three percent of the materials that volatilize at the temperatures used for baking the coatings.

Glycidyl methacrylate copolymers can also be prepared by emulsion polymerization, suspension polymerization, bulk polymerization or their suitable combinations. In these methods of preparing glycidyl methacrylate copolymers, chain transfer agents may be required to control the molecular weight of the copolymer to a desired range. The solid copolymers obtained by these methods must also be dried to contain less than 3% of the materials that volatilize at the temperatures used for baking the coatings.

For powder coating applications, molecular weight and molecular weight distribution of the glycidyl methacrylate copolymer is important. Copolymer of average molecular weight ($\overline{M}_n$) in the range of 2500 to 8500 are suitable. These copolymers, however, must not contain significant amount of higher molecular weight fractions. No more than 2% of the copolymer can be of molecular weight greater than 20,000. The molecular weight distribution as measured by the ratio of weight average molecular weight to number average molecular weight ($\overline{M}_w/\overline{M}_n$) should be in the range of 1.6 to 2.1. The preferred range of molecular weight distribution is in the range of 1.7 to 1.8.

Another one of the materials of individual ones of the powder coating compositions of this invention is a cross linking agent formed of a phenolic hydroxy terminated resin. This resin is present in the amount of 0.8 to 1.1 phenolic hydroxy groups for each epoxy group in the copolymer. In greater detail, the phenolic hydroxy terminated resin may be a phenolic hydroxy terminated ether having a molecular weight in the range of 600 to 3000.

Such an ether may be prepared by reacting one equivalent weight of an epoxy resin having a molecular weight in the range from about 250 to about 2000 with one and a half to three equivalent weights of a diphenol having a molecular weight from about 110 to about 550.

Some suitable epoxy resins for forming the carboxy terminated polymer are the following which all have the common structural formula:

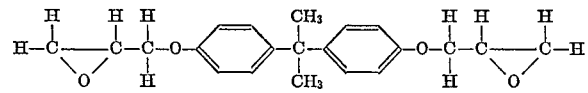

These resins have the following typical properties:

| Trademark of— | Epoxide equivalent | Molecular Weight average |
|---|---|---|
| Epon 828 (Shell Co.) | 175–210 | 380 |
| Epon 829 (Shell Co.) | 175–210 | 380 |
| Der 332 (Dow Co.) | 172 | 355 |

These epoxy resins are reacted with diphenols to produce the phenolic hydroxy terminated ether which may be used as one of the cross linking agents suitable for the powder coating composition of this invention. The greater weight molecular ethers are produced by increasing the amount of epoxy resin used in the reaction so that the intermediate portion of the ether is formed with a higher molecular weight. The diphenol and epoxy resin may be either fully reacted to form the cross linking agent or only semi-reacted to form the cross linking agent. When the diphenol and the resin are only semi-reacted, the completion of the reaction therebetween takes place during the baking of the powder coating composition to produce a finished coating. The technique of semi-reaction is used when the fully reacted ether is not suitable for powdering and the semi-reacted materials are suitable for powdering. The use of diphenolic hydroxy terminated cross linking agents which are not friable powders, but are viscous liquids, or are difficult to grind, is limited so that the weight percentage of such a cross linking agent is limited to a minor constituent of the powder. Diphenolic hydroxy terminated, saturated polyesters may also be used as cross linking agents.

Some of the diphenols suitable for reacting with the epoxy resins are as follows:

Bisphenol A;
dihydroxydiphenyl sulfone;
1,1'-bis(4-hydroxyphenyl) cyclohexane;
2,2'-biphenol; 4,4'-biphenol;
1,3-dihydroxynaphthalene;
bis(2-hydroxyphenyl) methane;
4,4'-dihydroxydiphenyl sulfide;
4-4'-dihydroxydiphenyl oxide;
bis(4-hydroxyphenyl) methane and
2-2'-bis-(4-hydroxyphenyl) butane.

A flow control agent is also included in forming each individual one of the powder coating compositions of this invention. The flow control agent forms at least 0.05% by weight of an individual powder coating. The flow control agent generally does not exceed about 4% by weight of any individual powder coating composition. In general, the flow control agent is a polymer having a molecular weight ($\overline{M}_n$) of at least 1000. Further, the flow control agent has, at the baking temperature of the powder coating composition, a lower surface tension than the surface tension of the copolymer employed in forming the composition.

One type of material which is used as a flow control agent in the powder coating compositions is an acrylic polymer having a glass transition temperature below the glass transition temperature of the composition's copolymer. Some acrylic polymers which are preferred as flow control agents are polylauryl acrylate, polybutyl acrylate and poly (2-ethylhexyl acrylate). Acrylic polymers to be used as flow control agents can be prepared by polymerization of the acrylate or methacrylate monomers in bulk or in suitable solvent using well known free radical initiators. The amount of the initiator and the polymerization conditions are chosen so that polymer formed has molecular weight ($\overline{M}_n$) above 1000. The preferred molecular weight range of the acrylate polymer is above 3000. The most preferred range of the acrylate polymer is 5000 to 20,000.

Although polymeric acrylate flow control agents are preferred, fluorinated polymers have been found to act as flow control agents for the powder coating compositions. Such fluorinated polymers are esters of polyethyleneglycol or polypropyleneglycol and fluorinated fatty acids. Esters of polyethyleneglycol of molecular weight ($\overline{M}_n$) of over 2500 and perfluoro octanoic acid are useful as flow control agents for the compositions of this invention.

The individual powder coating compositions of this invention each contain a small, effective, weight percentage of a catalyst. In general, the catalyst is present in an individual composition in a range from 0.05% by weight to 1.0% by weight. The catalyst is selected to produce a gel time for the powder coating composition greater than at least 1 minute at the baking temperature of the composition. A suitable catalyst is also one which will produce a gel time that does not exceed 40 minutes. As used herein, the gel time of a coating composition is that time in which the coating composition develops elasticity and resistance to flow at the baking temperature.

Some catalyst which are suitable for use in the powder coating composition include tetralkylammonium salts, imidazole type catalysts, tertiary amines and metal salts of organic carboxylic acids. The tetralkylammonium salts catalysts include the following: tetrabutyl ammonium bromide, tetrabutyl ammonium iodide, tetraethyl ammonium chloride (bromide or iodide), tetramethyl ammonium chloride (bromide or iodide), trimethylbenzyl ammonium chloride, dodecyl dimethyl (2-phenoxyethyl) ammonium bromide and diethyl (2-hydroxy ethyl) methyl ammonium bromide. Suitable catalysts of the imidazole type include: 2-methyl-4-ethyl imidazole, 2-methyl imidazole, imidazole, 2-[(N-benzylanilino)methyl]-2-imidazoline phosphate, and 2-benzyl-2-imidazoline hydrochloride. Suitable tertiary amine catalysts for the powder coating compositions of this invention include: triethylenediamine, N,N-diethylcyclohexylamine, and N-methyl morpholine. The metal salts of organic carboxylic acid which are catalyst for the powder coatings of this invention include, but are not limited to: stannous octoate, zinc naphthenate, cobalt naphthenate, zinc octoate, stannous 2-ethylhexoate, phenylmercuric propionate, lead neodecanoate, dibutyl tin dilaurate and lithium benzoate.

The catalyst used in an individual powder coating composition is generally solid at room temperature and has a melting point of from 50° C. to 200° C. As previously specified, the catalyst is present in a powder coating composition from 0.05% by weight to 1.0% by weight of the total weight of the powder composition. Further, the catalyst produces a gel time of at least 1 minute and no greater than 40 minutes. Generally, the preferred gel time of the composition is in the range of from 1 minute to approximately 10 minutes at the baking temperature of the composition.

Since individual powder coating compositions of this invention can be applied to an article to be painted by electrostatic methods, it is preferred to include a small weight percentage of an antistatic agent in such compositions so that the deposition thereof is accomplished in a proper manner. In particular, the antistatic agent is included in a range from 0.05% to 1.0% by weight of the total powder composition. Suitable antistatic agents include, but are not limited to, tetralkylammonium salts as discussed previously and which also serve as catalysts.

Other suitable antistatic agents include: alkyl-poly(ethyleneoxy) phosphates as, for example, dibutylpoly(ethyleneoxy) phosphate or alkylaryl poly(ethyleneoxy) phosphates as, for example, ethyl benzyl poly(ethyleneoxy) phosphate; polyethyleneimine, poly(2-vinyl pyrrolidone), pyridinium chloride, poly(vinyl pyridinium chloride), polyvnyl alcohol or inorganic salts.

In order to give individual powder coating compositions of this invention a suitable color, a pigment is included in the coating composition. In general, the pigment forms from about 6% by weight to about 35% by weight of the total powder coating composition. Pigments which are suitable for powder coating compositions include, but are not limited to, the following: basic lead silico chromate 30% by weight (orange); titanium dioxide 30% by weight (white); titanium dioxide 15% by weight plus ultra marine blue 10% by weight (blue); phthalocyanine blue 7% by weight plus titanium dioxide 10% by weight (blue); phthalocyanine green 7% by weight plus titanium dioxide 10% by weight (green); ferrite yellow 7% by weight plus titanium dioxide 10% by weight (yellow); carbon black pigment 6% by weight (black); black iron oxide 10% by weight (black); chromium green oxide 8% by weight plus titanium dioxide 10% by weight (green); quindo red 5% by weight plus titanium dioxide 16% by weight (red); and iron oxide transparent orange pigment 10% by weight (orange). Metallic aluminum pigment may also be included to give the baked coating a metallic look. Such aluminum is included up to 10% by weight.

Having generally described the various materials which are employed in formulating the powder coating compositions of this invention, a plurality of examples will be set forth to illustrate various individual powder coating compositions.

Example 1

The monomers, glycidyl methacrylate 15% by weight, methyl methacrylate 45% by weight and butyl methacrylate 40% by weight are mixed together. Three weight percent of a catalyst 2,2'-azobis-(2-methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109° C.–112° C.) with only a small fraction of heat supplied from an external heater. After the addition of the monomer mixture is complete, the refluxing is maintained by external heat source for 3 additional hours.

The solution is poured into shallow stainless steel trays. These trays are placed in a vacuum oven and the solvent evaporated therefrom. As the solvent is removed, the copolymer solution becomes more concentrated. The temperature of the vacuum oven is raised to about 110° C. Drying is continued until the solvent content of the copolymer is below 3 percent. The trays are cooled and the copolymer collected and ground to pass through 20 mesh screen. The copolymer has a glass transition temperature of 53° C. and a molecular weight ($\overline{M}_n$) of 4000.

A phenolic hydroxy terminated resin is prepared in the following manner. Thirty-eight grams of Epon 829 is charged into a 500 ml. stainless steel beaker having a heating mantle. The epoxy resin is heated to 150° C. As the resin is stirred, 45.6 grams of bisphenol A is added over a 10 minute period. The temperature of the mixture is maintained at 150° C. for 1.5 hours while the mixture is stirred. The reacted mixture is poured out into an aluminum pan and cooled. The solid mixture, having a molecular weight of 836, is ground to pass through a 100 mesh screen. A portion of the phenolic hydroxy terminated resin is weighed out for making a powder coating composition of this invention.

One hundred parts by weight of the ground copolymer are mixed with the following materials:

| | Parts |
|---|---|
| Phenolic hydroxy terminated resin | 44 |
| Tetrabutyl ammonium bromide | 0.2 |
| Polylauryl acrylate ($\overline{M}_n$=10,000) | 0.5 |
| Titanium dioxide | 30 |

The materials are mixed together in a ball mill for 2 hours. The mixture is mill rolled at 85° C. to 90° C. for 5 minutes. The solid obtained is ground in a ball mill to pass through a 140 mesh screen.

The resulting powder thus obtained is a powder coating composition of the invention. The powder is sprayed on an electrically grounded, steel panel by using electrostatic powder spray gun operating at 50 kv. charging voltage. After spraying, the panel is heated at 175° C. for 20 minutes.

The coating obtained on the panel has good adhesion to the steel panel and good impact strength. The coating also is applied to and has good adhesion on panels of glass, brass, zinc, aluminum, copper and bronze. The coating obtained is not soluble in toluene, gasoline, butanone or methanol.

Example 2

The procedure of Example 1 is repeated. The formation of the copolymer, however, begins with a monomer mixture having glycidyl methacrylate 8% by weight, methyl methacrylate 52% by weight and butyl methacrylate 40% by weight. Three weight percent of the catalyst AIBN is employed. When the procedure of Example 1 is followed, the resulting copolymer has a glass transition temperature of 58° C. and a molecular weight of 4000.

A phenolic hydroxy terminated resin is made in the same manner as Example 1. In this case, seventy six grams of Epon 829 is reacted with 68.4 grams of bisphenol A in the 500 ml. stainless steel beaker. The resulting resin has a molecular weight of 1444.

One hundred parts of the copolymer produced is mixed with the same additional ingredients set forth in Example 1, except using 40.5 parts of the phenolic hydroxy terminated powder prepared. The quality of the painted panels obtained after application of the powder coating to various materials is about the same as achieved in Example 1.

Example 3

A monomer mixture having the following composition is prepared: glycidyl methacrylate 12% by weight, methyl methacrylate 48% by weight, and butyl methacrylate 40% by weight. The monomer mixture is processed in the same manner as described in Example 1 with 3% by weight of the catalyst AIBN employed. The resulting copolymer has a glass transition temperature of 56° C. and a molecular weight of 4000. A carboxy terminated polymer is prepared as described in Example 1 except 114 grams Epon 829 and 91.2 grams of bisphenol A are reacted to produce a resin having a molecular weight of 2052. One hundred parts of the copolymer is mixed with the same additional ingredients described in Example 1, except 86.5 parts of the phenolic hydroxy terminated powder prepared are used.

The powder coating composition obtained by following the process steps set forth in Example 1 is applied to test panels in the same manner as described in Example 1. The coating is baked at a temperature of 170° C. for 30 minutes. The coating obtained has good adhesion to steel, glass, brass, zinc, aluminum, copper and bronze.

Example 4

A monomer mixture having the following composition is prepared: glycidyl methacrylate 20% by weight, methyl methacrylate 40% by weight and butyl methachylate 40% by weight. A copolymer is formed from this monomer mixture in accordance with the same procedure as is outlined in Example 1. In this case, 1% by weight of the catalyst AIBN is added. The copolymer produced has a glass transition temperature of 51° C. and a molecular weight of 8500.

A phenolic hydroxy terminated resin is prepared as described in Example 1. In this case, however, 38 grams of Epon 829 is reacted with 38 grams of 4,4'-biphenol to produce a resin having a molecular weight of 760.

The ground copolymer (100 parts by weight) is added to the following materials:

| | Parts |
|---|---|
| Phenolic hydroxy terminated resin | 53.5 |
| Tetrabutylammonium chloride | 0.1 |
| Polybutylacrylate ($\overline{M}_n$=9000) | 4 |
| Titanium dioxide | 15 |
| Transparent blue | 4 |
| Metallic aluminum flakes | 4 |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 200° C. for 10 minutes is of good quality, is solvent and scratch resistant, and has a metallic appearance.

Example 5

A monomer mixture having the following composition is prepared: glycidyl methacrylate 25% by weight, methyl methacrylate 40% by weight and butyl methacrylate 35% by weight. The monomers are reacted as described in Example 1 to produce a copolymer. In this case, 6% by weight of the catalyst AIBN is employed. The resulting copolymer has a glass transition temperature of 53° C. and a molecular weight of 2000.

A phenolic hydroxy terminated resin is prepared as described in Example 1. In this case, however, 70 grams of DER 332 is reacted with 75 grams of dihydroxydiphenyl sulfone and 0.8 grams tetrabutyl ammonium iodide (catalyst) to produce a resin having a molecular weight of 1450.

One hundred parts by weight of the copolymer obtained is mixed with the following materials:

| | Parts |
|---|---|
| Phenolic hydroxy terminated resin | 128 |
| 2-methyl-4-ethylimidazole | 0.05 |
| Dibutyl poly(ethyleneoxy phosphate) | 0.05 |
| Polyisododecyl methacrylate | 4 |
| Titanium dioxide | 10 |
| Phthalocyanine blue | 7 |

A powder coating composition is obtained by following the process steps set forth in Example 1. The coating composition is applied to a series of test panels and baked at the temperature of and for the same time as Example 4. The coating obtained on the various test panels is of good quality with respect to its adhesion, appearance and impact characteristics.

Example 6

A monomer mixture having the following composition is prepared: glycidyl methacrylate 15% by weight, butyl acrylate 20% by weight and methyl methacrylate 65% by weight. The monomer is reacted as set forth in Example 1 in order to produce a copolymer. Four percent by weight of the catalyst AIBN is employed in reacting the monomer mixture to form the copolymer. The copolymer has a glass transition temperature of 65° C. and a molecular weight of 3000.

A phenolic hydroxy terminated resin is prepared as described in Example 1. In this case, however, 35 grams of DER 332 is reacted with 50 grams of dihydroxydiphenyl sulfone and 0.5 gram of tetrabutyl ammonium iodide (catalyst) to produce a resin having a molecular weight of 850.

One hundred parts by weight of the copolymer obtained is added to the following materials:

| | Parts |
|---|---|
| Phenolic hydroxy terminated resin | 45 |
| Triethylene diamine | 0.1 |
| Tetraethylammonium chloride | 0.5 |
| Polyaurylmethacrylate ($\overline{M}_n$=6000) | 2 |
| Phthalocyanine green | 7 |
| Titanium dioxide | 10 |

The above described materials are processed as described in Example 1 in order to produce a powder coating composition. The powder coating composition is applied to test panels as described in Example 1 and baked on the panels at a temperature of 150° C. for 15 minutes.

The coating obtained has good adhesion to steel, glass, brass, zinc, aluminum, copper and bronze and is insoluble in toluene, gasoline, methanol and butanone.

Example 7

A monomer mixture having the following composition is prepared: glycidyl methacrylate 15% by weight, methyl methacrylate 50% by weight and styrene 35% by weight. The monomers are reacted in accordance with the procedure set forth in Example 1 with 3% by weight of the catalyst AIBN being utilized. The resulting ground copolymer has a molecular weight of 4500 and a glass transition temperature of 90° C.

A phenolic hydroxy terminated resin is prepared as described in Example 1. In this case, however, 38 grams of Epon 828 is reacted with 54 grams of 1,1'-bis(4-hydroxyphenyl)cyclohexane and 0.6 gram of tetrabutyl ammonium iodide (catalyst) to produce a resin having a molecular weight of 916.

One hundred parts by weight of the copolymer obtained is added to the following materials:

| | Parts |
|---|---|
| Phenolic hydroxy terminated resin | 49 |
| Tetramethylammonium chloride | 1 |
| Poly(2-ethylhexyl acrylate) | 2 |
| Ferrite yellow | 7 |
| Titanium dioxide | 10 |

This mixture is processed as described in Example 1 in order to form a powder coating composition. The powder coating composition is applied to test panels as described in Example 1. The panels are baked at a temperature of 180° C. for 5 minutes. The adhesion quality of the powder coating after baking on the various test panels is good. The coating on each panel possesses good solvent and scratch resistance.

Example 8

A monomer mixture having the following composition is formed: glycidyl methacrylate 18% by weight, ethyl acrylate 20% by weight, methyl methacrylate 40% by weight, vinyl chloride 22% by weight. The monomer mixture is polymerized by using 2 weight percent of AIBN as the initiator.

A phenolic hydroxy terminated resin is prepared as described in Example 1. In this case, however, 38 grams of Epon 829 is reacted with 32 grams of 1,3-dihydroxynaphalene to produce a resin with a molecular weight of 700.

One hundred parts of the ground copolymer obtained is added to the following materials:

| | Parts |
|---|---|
| Phenolic hydroxy terminated resin | 43 |
| Trimethyl benzyl ammonium chloride | 0.1 |
| Poly(2-ethylhexyl acrylate)($\overline{M}_n$=11,000) | 2 |
| Carbon black | 6 |

The above materials are mixed and processed as set forth in Example 1. The resulting powder coating composition is applied to test panels as specified in Example 1.

The coating composition is baked at 170° C. for 15 minutes. All the painted panels exhibit good adhesion and solvent resistant properties.

Example 9

A monomer mixture having the following composition is formed: glycidyl methacrylate 15% by weight, methyl methacrylate 30% by weight, isobutyl acrylate 25% by weight, alpha methyl styrene 15% by weight and methacrylonitrile 15% by weight. The monomer mixture is reacted in the same manner as described in Example 1. Three percent of the catalyst AIBN is employed. The resulting copolymer has a glass transition temperature of 46° C. and a molecular weight of 4500.

A phenolic hydroxy terminated resin is prepared as described in Example 1. In this case, however, 38 grams of Epon 829 is reacted with 40 grams of bis(2-hydroxyphenyl(methane to produce a resin having a molecular weight of 780.

One hundred parts of the ground copolymer obtained is added to the following materials:

| | Parts |
|---|---|
| Phenolic hydroxy terminated resin | 41 |
| Dodecyldimethyl (2-phenoxy-ethyl) ammonium bromide | 0.5 |
| Polyethylene glycol perfluoro octonoate ($\overline{M}_n$=3400) | 2 |
| Black iron oxide | 10 |

The mixture so formed is processed as described in Example 1 to produce a powder coating composition. This powder coating composition is applied to test panels as it is described in Example 1. The coated panels are baked at 165° C. for 15 minutes. The coating on each panel has good adhesion and solvent resistance.

Example 10

A monomer mixture having the following composition is prepared: glycidyl methacrylate 5% by weight, methyl methacrylate 55% by weight, and butyl methacrylate 40% by weight. The monomer mixture is reacted as described in Example 1 with 6% by weight of the catalyst AIBN. The resulting copolymer has a glass transition temperature of 55° C. and a molecular weight of 3000.

A phenolic hydroxy terminated resin is prepared as described in Example 1 by reacting 38 grams of Epon 829 with 44 grams of 4,4'-dihydroxydiphenyl sulfide to produce a resin having a molecular weight of 816.

One hundred parts by weight of the ground copolymer is mixed with the following materials:

| | Parts |
|---|---|
| Phenolic hydroxy terminated resin | 14.5 |
| Tetraethylammonium bromide | 1 |
| Ethyl benzyl (ethyleneoxy) phosphate | 5 |
| Poly(2-ethylhexyl acrylate) | 0.4 |
| Chromium green oxide | 8 |
| Titanium dioxide | 10 |

The above mixture is processed as described in Example 1 to produce a powder coating composition. The powder coating composition is applied to a plurality of test panels. The panels are baked at a temperature of 170° C. for 20 minutes. The adhesion to the test panels of the powder coating material is poor and coating has a tendency to chip and crack.

Example 11

A monomer mixture is formed having the following composition: glycidyl methacrylate 12% by weight methyl methacrylate 50% by weight, 2-ethylhexyl acrylate 10% by weight and acrylonitrile 28% by weight. The monomer mixture is processed as set forth in Example 1 in order to form a copolymer. Four percent by weight of the catalyst AIBN is added. The copolymer formed has a glass transition temperature of 60° C. and a molecular weight of 4000.

A phenolic hydroxy terminated resin is prepared as described in Example 1 by reacting 152 grams of Epon 829 with 114 grams of bisphenol A to produce a resin having a molecular weight of 2660.

One hundred parts by weight of the ground copolymer is mixed with the following materials:

| | Parts |
|---|---|
| Phenolic hydroxy terminated resin | 112 |
| Stannous octoate | 0.5 |
| Tetraethylammonium bromide | .05 |
| Polyethylene glycol perfluoro octonate ($\overline{M}_n$=3500) | 2 |
| Quindo red | 4 |
| Metallic aluminum flakes | 4 |

The mixture above described is processed as set forth in Example 1 to produce a powder coating composition. The powder coating composition is applied to test panels as described in Example 1. The panels are baked at 150° C. for 20 minutes. The adhesion to the panels of the powder coating is good, each of the coatings possess good solvent resistance and has a metallic appearance.

Example 12

A monomer mixture having the following composition is prepared: glycidyl methacrylate 22% by weight, n-hexyl methacrylate 20% by weight, butyl methacrylate 25% by weight and acrylonitrile 33% by weight. A copolymer is formed from this monomer mixture in accordance with the same procedure as is outlined in Example 1. In this case, 1.5% by weight of the catalyst AIBN is added. The copolymer produced has a glass transition temperature of 40° C. and a molecular weight of 7500.

A phenolic hydroxy terminated resin is prepared as described in Example 1. In this case, however, 38 grams of Epon 829 is reacted with 40.5 grams of 4,4'-dihydroxydiphenyl oxide to produce a resin with a molecular weight of 784.

The ground copolymer (100 parts by weight) is added to the following materials:

| | Parts |
|---|---|
| Phenolic hydroxy terminated resin | 61 |
| Zinc octoate | 0.8 |
| Tetrabutylammonium iodide | 1.0 |
| Polybutyl acrylate | 2.0 |
| Iron oxide transparent orange | 4 |
| Metallic aluminum flakes | 4 |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 140° C. for 20 minutes is of good quality and is solvent and scratch resistant.

Example 13

A monomer mixture having the following composition is prepared: glycidyl methacrylate 10% by weight, methyl methacrylate 45% by weight, butyl methacrylate 35% by weight and vinyl acetate 10% by weight. A copolymer is formed from this monomer mixture in accordance with the same procedure as is outlined in Example 1. In this case, 3% by weight of the catalyst AIBN is added.

A phenolic hydroxy terminated resin is prepared as described in Example 1. In this case, however, 38 grams of Epon 829 is reacted with 40 grams of bis(4-hydroxyphenyl) methane to produce a resin having a molecular weight of 780.

The ground copolymer (100 parts by weight) is added to the following materials:

| | Parts |
|---|---|
| Phenolic hydroxy terminated resin | 27.5 |
| Tetrabutylammonium bromide | 2 |
| Poly(2-ethylhexyl acrylate) | 3.5 |
| Carbon black | 6 |

The above ingredients are mixed together and processed in accordance with the procedure of Example 1 to obtain a powder coating composition. The powder coating composition is sprayed on various test panels. The coating obtained on each test panel after curing of the powder coating composition at a temperature of 160° C. for 10 minutes is of good quality. Also, the coating obtained on each test panel is insoluble in toluene, gasoline, methanol and butanone.

Example 14

A monomer mixture having the following composition is prepared: glycidyl methacrylate 8% by weight, methyl methacrylate 52% by weight and isobutyl methacrylate 40% by weight. A copolymer is formed from this monomer mixture in accordance with the same procedure as is outlined in Example 1. In this case, 5% by weight of the catalyst AIBN is added. The copolymer produced has a glass transition temperature of 75° C. and a molecular weight of 3200.

A phenolic hydroxy terminated resin is prepared as described in Example 1. In this case, however, 38 grams of Epon 828 is reacted with 38 grams of 2,2′-biphenol and 0.4 gram tetrabutyl ammonium iodide (catalyst) to produce a resin having a molecular weight of 752.

The ground copolymer (100 parts by weight) is added to the following materials:

| | Parts |
|---|---|
| Phenolic hydroxy terminated resin | 21 |
| Tetrabutylammonium bromide | 2 |
| Polylauryl acrylate | 4 |
| Titanium dioxide | 30 |

The above ingredients are mixed together and processed in accordance with the procedure of Example 1 to obtain a powder coating composition. The powder coating composition is sprayed on various test panels of steel, brass, glass, zinc, aluminum, copper and bronze. The coating obtained on each test panel after curing of the powder coating composition at a temperature of 130° C. for 10 minutes is of good quality and is solvent and scratch resistant.

Example 15

A monomer mixture having the following composition is prepared: glycidyl methacylate 10% by weight, methyl methacrylate 67% by weight, and n-butyl methacrylate 23% by weight. A copolymer is formed from this monomer mixture in accordance with the procedure as is outlined in Example 1. In this case, 4% by weight of the catalyst AIBN is added. The copolymer produced has a glass transition temperature of 73° C. and a molecular weight of 3000.

A phenolic hydroxy terminated resin is prepared as described in Example 1. In this case, however, 38 grams of Epon 829 is reacted with 48.5 grams of 2,2′-bis(4-hydroxyphenyl) butane to produce a resin having a molecular weight of 865.

The ground copolymer (100 parts by weight) is added to the following materials:

| | Parts |
|---|---|
| Phenolic hydroxy terminated resin | 30 |
| Tetrabutylammonium chloride | 0.7 |
| Polybutyl acrylate | 2 |
| Titanium dioxide | 30 |

The above ingredients are mixed together and processed in accordance with the procedure of Example 1 to obtain a powder coating composition. The powder coating composition is sprayed on various test panels. The coating obtained on each test panel after curing of the powder coating composition at a temperature of 180° C. for 15 minutes is of good quality. Also, each of the test panels coating's is resistant to and insoluble in toluene, gasoline, methanol and butanone.

Example 16

A monomer mixture having the following composition is prepared: glycidyl methacrylate 15% by weight, methyl methacrylate 32% by weight, ethyl acrylate 15% by weight, isobutyl acrylate 8% by weight, and styrene 30% by weight. A copolymer is formed from this monomer mixture in accordance with the same procedure as is outlined in Example 1. In this case, 3% by weight of the catalyst AIBN is added.

A phenolic hydroxy resin is prepared as in Example 1. In this case 65 grams of Epon 1001 is reacted with 45 grams of 4,4′-dihydroxydiphenyl sulfone at 150° C. for 2 hours using 0.5 gram of trimethylbenzylammonium chloride as the catalyst.

The ground copolymer (100 parts by weight) is added to the following materials:

| | Parts |
|---|---|
| Phenolic hydroxy terminated resin | 83 |
| Tetraethylammonium bromide | 1 |
| Polyisodecyl methacrylate ($\overline{M}_n$=5000) | 1.5 |
| Titanium dioxide | 30 |

The above ingredients are mixed together and processed in accordance with the procedure of Example 1 to obtain a powder coating composition. The powder coating composition is sprayed on various test panels of steel, glass, brass, zinc, aluminum, copper and bronze. The coatings obtained on each test panel after curing of the powder coating composition at a temperature of 120° C. for 15 minutes is of good quality and has good adhesion characteristics. The powder coating composition on each panel is resistant to the solvents previously mentioned.

Example 17

A monomer mixture having the following composition is prepared: glycidyl methacrylate 15% by weight, methyl methacrylate 40% by weight, 2-ethylhexyl acrylate 15% by weight, alpha methyl styrene 20% by weight and acrylonitrile 10% by weight. A copolymer is formed from this monomer mixture using 4% by weight of the catalyst AIBN. A pehnolic hydroxy terminated resin is prepared as described in Example 1.

The ground copolymer (100 parts by weights) is added to the following materials:

| | Parts |
|---|---|
| Phenolic hydroxy terminated resin | 48.5 |
| Tetraethylammonium bromide | 0.4 |
| Poly(2-ethylhexyl acrylate) | 2 |
| Titanium dioxide | 30 |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 170° C. for 20 minutes is of good quality and resistant to the aforementioned solvents.

Example 18

A monomer mixture having the following composition is prepared: glycidyl methacrylate 20% by weight, butyl acrylate 40% by weight, methyl methacrylate 10% by weight and styrene 30% by weight. A copolymer is formed from this monomer mixture in accordance with the same procedure as is outlined in Example 1. In this case, 4% by weight of the catalyst AIBN is added. The copolymer produced has a glass transition temperature of 40° C. and a molecular weight of 3000. A phenolic hydroxy terminated resin is prepared as described in Example 2.

The ground copolymer (100 parts by weight) is added to the following materials:

| | Parts |
|---|---|
| Phenolic hydroxy terminated resin | 82.4 |
| Tetraethylammonium bromide | 0.5 |
| Polylauryl acrylate | 1.0 |
| Titanium dioxide | 30 |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 180° C. for 10 minutes is of good quality and is resistant to the aforementioned solvents.

Example 19

A monomer mixture having the following composition is prepared: glycidyl methacrylate 15% by weight, butyl methacrylate 15% by weight, ethyl acrylate 15% by weight, methyl methacrylate 30% by weight and styrene 25% by weight. A copolymer is formed from this monomer mixture in accordance with the same procedure as is outlined in Example 1. In this case, 4% by weight of the catalyst AIBN is added. A pehnolic hydroxy terminated resin is prepared as described in Example 11.

The ground copolymer (100 parts by weight) is added to the following materials:

| | Parts |
|---|---|
| Phenolic hydroxy terminated resin | 140 |
| Tetraethylammonium bromide | 1.0 |
| Polylauryl acrylate | 0.5 |
| Titanium dioxide | 30 |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 130° C. for 30 minutes is of good quality and resistant to the aforementioned solvents.

Example 20

A monomer mixture having the following composition is prepared: glycidyl methacrylate 15% by weight, 2-ethylhexyl acrylate 10% by weight, methyl methacrylate 50% by weight, methacrylonitrile 15% by weight and alpha methyl styrene 10% by weight. A copolymer is formed from this monomer mixture in accordance with the same procedure as is outlined in Example 1. In this case, 4% by weight of the catalyst AIBN is added. A phenolic hydroxy terminated resin is prepared as described in Example 3.

The ground copolymer (100 parts by weight) is added to the following materials:

| | Parts |
|---|---|
| Phenolic hydroxy terminated resin | 108 |
| Tetraethylammonium bromide | 0.5 |
| Polylauryl acrylate | 2.5 |
| Titanium dioxide | 30 |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 135° C. for 30 minutes is of good quality. Also, the coatings are resistant to and insoluble in toluene, gasoline, methanol and butanone.

Example 21

A monomer mixture having the following composition is prepared: glycidyl methacrylate 30% by weight, methyl methacrylate 60% by weight, and n-butyl methacryllate 10% by weight. A copolymer is formed from this monomer mixture in accordance with the procedure as is outlined in Example 1. In this case, 4% by weight of the catalyst AIBN is added. A phenolic hydroxy terminated resin is prepared as described in Example 3.

The ground copolymer (100 parts by weight) is added to the following materials:

| | Parts |
|---|---|
| Phenolic hydroxy terminated resin | 200 |
| Tetrabutylammonium chloride | 0.7 |
| Polybutyl acrylate | 2 |
| Titanium dioxide | 30 |

The above ingredients are mixed together and processed in accordance with the procedure of Example 1 to obtain a powder coating composition. The powder coating composition is sprayed on various test panels. The coating obtained on each test panel after curing of the powder coating composition at a temperature of 170° C. for 15 minutes is of good quality. Also, each of the test panels coating's is resistant to and insoluble in toluene, gasoline, methanol and butanone.

Example 22

A monomer mixture having the following composition is prepared: glycidyl methacrylate 35% by weight, methyl methacrylate 55% by weight, and n-butyl methacrylate 10% by weight. A copolymer is formed from this monomer mixture in accordance with the procedure as is outlined in Example 1. In this case, 4% by weight of the catalyst AIBN is added. A phenolic hydroxy terminated resin is prepared as described in Example 11.

The ground copolymer (100 parts by weight) is added to the following materials:

| | Parts |
|---|---|
| Phenolic hydroxy terminated resin | 270 |
| Tetrabutylammonium chloride | 0.7 |
| Polybutyl acrylate | 2 |
| Titanium dioxide | 30 |

The above ingredients are mixed together and processed in accordance with the procedure of Example 1 to obtain a powder coating composition. The powder coating composition is sprayed on various test panels. The coating obtained on each test panel after curing of the powder coating composition at a temperature of 175° C. for 18 minutes is of poor quality and shows low impact strength.

The use of glycidyl methacrylate copolymers and dicarboxylic acid cross linking agents in a liquid paint system is described in U.S. Pat. 2,857,354. However, the powder coating compositions of this invention are substantially different than the liquid paint compositions described in the examples of that patent. This difference can be best illustrated by attempting to prepare powder coating compositions by evaporating the solvents from the liquid paint systems described in the examples of the patent. Dry powders cannot be prepared from the compositions of Examples 4 and 5 of the patent. Powders prepared from the compositions of Examples 1, 2, 3 and 6, when deposited on a metal panel, do not fuse together to form a film when the panels are baked at 150 to 200° C. for 20 minutes. The baked coatings on test panels are not smooth, but rather, are rough. Also, the baked coatings possess very low gloss, and have a lack of flexibility and adhesion. It, therefore, can be concluded that compositions which are generally suitable for liquid paint systems are not necessarily suitable for powder paints by simply evaporating the solvents therefrom.

The use of a dicarboxylic acid as a cross linking agent for glycidyl methacrylate terpolymers is mentioned in U.S. Pat. 3,058,947. In order to test these materials, compositions of Example VII of this patent are dried by evaporating solvents under vacuum. The materials are ground to pass through a 200 mesh screen. Samples of the ground powder are deposited on metal panels and baked at 160° C. for 45 minutes. The coatings obtained show an abundance of craters, are inferior in gloss and smoothness, and lack the impact properties described in the Example VII. It is, therefore, concluded that there is a substantial difference in paint films produced on a panel when the coating is produced on one hand by a liquid system, and, on the other hand, by a powder system. Other improvements specific to the powders are needed in order to obtain paints of acceptable quality. The reason for the difference between the properties and appearance of powder coatings derived by solvent evaporation from a liquid coating and the liquid coatings itself are not clear. It is, however, certain that the powders obtained by drying liquid paint compositions are not useful for powder coating compositions.

There has been disclosed herein powder coating compositions which may be employed in the painting of articles. The powder coating compositions have a longer shelf life, are non-caking, are less corrosive to metal equipment, and are better for use with metallic aluminum pigment than powder coating using only dicarboxylic acids as cross linking agents.

Many modifications of this invention will be apparent to those skilled in the art in view of this specification. It is intended that all such modifications which fall within the scope of this invention be included within the appended claims.

We claim:

1. A powder coating composition comprising a mixture of:
   (A) a copolymer of a glycidyl ester of a monoethylenically unsaturated acid and an ethylenically unsaturated compound in such proportions as to obtain a copolymer with a glass transition temperature in the range of 40° C. to 90° C. and a molecular weight ($\overline{M}_n$) in the range of 2500 to 8500, said glycidyl ester being present in the copolymer from at least about 8% by weight to no more than about 30% by weight;
   (B) a phenolic hydroxy terminated resin in the amount of 0.8 to 1.1 phenolic hydroxy groups for each epoxy group in the copolymer;
   (C) a flow control agent forming at least 0.05% to 4.0% by weight of the mixture, said flow control agent being a polymer having a molecular weight ($\overline{M}_n$) of at least 1000, and having at the baking temperature of the powder coating composition, a lower surface tension than the surface tension of the copolymer, said flow control agent further being a polymer or copolymer selected from the group consisting of acrylate esters, methacrylate esters and polyethylene or polypropylene glycol esters of fluorinated fatty acids; and
   (D) a small weight percent of a catalyst which produces a gel time for the coating composition greater than 1 minute at the baking temperature of the composition.

2. The powder coating composition of claim 1 wherein: said phenolic hydroxy terminated resin is a polyether.

3. The powder coating composition of claim 1 wherein: said phenolic hydroxy terminated resin is a polyether having a molecular weight in the range of 600 to 3000.

4. The powder coating composition of claim 1 wherein: said phenolic hydroxy terminated resin is a polyether produced by reacting one equivalent weight of a diepoxy resin with one and a half to three equivalent weights of a diphenol.

5. The powder coating composition of claim 1 wherein: said phenolic hydroxy terminated resin is a polyether produced by reacting one equivalent weight of a diepoxy resin having a molecular weight in the range from about 250 to about 2000 with one and a half to three equivalent weights of a diphenol having a molecular weight in the range from about 110 to about 550.

6. The powder coating composition of claim 1 wherein: said copolymer has a glass transition temperature in the range of 50° C. to 80° C. and a molecular weight ($\overline{M}_n$) in the range of 3000 to 6500, said glycidyl ester being present in said copolymer from at least 10% by weight to no more than 25% by weight.

7. The powder coating composition of claim 1 wherein: said copolymer has a glass transition temperature in the range of 50° C. to 70° C. and a molecular weight ($\overline{M}_n$) in the range of 3000 to 4000, said glycidyl ester being present in said copolymer from at least 12% by weight to no more than 20% by weight.

8. A powder coating composition comprising a mixture of:
   (A) a copolymer of a glycidyl ester of a monoethylenically unsaturated acid and (1) an ethylenically unsaturated monomer selected from the group consisting of methyl methacrylate, butyl methacrylate, butyl acrylate, ethyl acrylate, and 2-ethylhexyl acrylate; and (2) a modifying monomer selected from the group consisting of styrene, alpha methyl styrene, acrylonitrile and methacrylonitrile, in such proportions as to obtain a copolymer having a glass transition temperature in the range of 40° C. to 90° C. and a molecular weight $\overline{M}_n$) in the range of 2500 to 8500, said glycidyl ester being present in the copolymer from at least about 8% by weight to no more than 30% by weight, said modifying monomer being present in the copolymer from 0% by weight to no more than about 35% by weight;
   (B) a phenolic hydroxy terminated resin in the amount of 0.8 to 1.1 phenolic hydroxy groups for each epoxy group in the copolymer;
   (C) a flow control agent forming at least 0.05% to 4.0% by weight of the mixture, said flow control agent being a polymer having a molecular weight ($\overline{M}_n$) of at least 1000, and having at the baking temperature of the mixture a lower surface tension than the surface tension of the copolymer, said flow control agent further being a polymer or copolymer selected from the group consisting of acrylate esters, methacrylate esters and polyethylene or polypropylene glycol esters of fluorinated fatty acids; and
   (D) a small weight percentage of a catalyst which produces a gel time for the powder coating composition at its baking temperature of at least 1 minute.

9. The powder coating composition of claim 8 wherein: said phenolic hydroxy terminated resin is a polyether.

10. The powder coating composition of claim 8 wherein: said phenolic hydroxy terminated resin is a polyether having a molecular weight in the range of 600 to 3000.

11. The powder coating composition of claim 8 wherein: said phenolic hydroxy terminated resin is a polyether produced by reacting one equivalent weight of a diepoxy resin with one and a half of three euivalent weights of a diphenol.

12. The powder coating composition of claim 8 wherein: said phenolic hydroxy terminated resin is a polyether produced by reacting one equivalent weight of a diepoxy resin having a molecular weight in the range from about 250 to about 2000 with one and a half to three equivalent weights of a diphenol having a molecular weight in the range from about 110 to about 550.

13. The powder coating composition of claim 8 wherein: said copolymer has a glass transition temperature in the range of 50° C. to 80° C. and a molecular weight ($\overline{M}_n$) in the range of 3000 to 6500, said glycidyl ester being present in said copolymer from at least 10% by weight to no more than 25% by weight.

14. The powder coating ccomposition of claim 8 wherein: said copolymer has a glass transition temperature in the range of 50° C. to 70° C. and a molecular weight ($\overline{M}_n$) in the range of 3000 to 4000, said glycidyl ester being present in said copolymer from at least 12% by weight to no more than 20% by weight.

15. A powder coating composition comprising a mixture of:
(A) a copolymer of glycidyl methacrylate, methyl methacrylate and butyl methacrylate, said glycidyl methacrylate being present in the copolymer from about 8% by weight to no more than about 30% by weight, said methyl methacrylate being present in the copolymer from about 15% by weight to about 52% by weight, with the balance of the copolymer being said butyl methacrylate, the copolymer having a glass transition temperature in the range of 40° C. to 90° C. and a molecular weight ($\overline{M}_n$) in the range of 2500 to 8500;
(B) a phenolic hydroxy terminated resin in the amount of 0.8 to 1.1 phenolic hydroxy groups for each epoxy group in the copolymer;
(C) a flow control agent forming at least about 0.05% to 4.0% by weight of the mixture, said flow control agent being a polymer having a molecular weight ($\overline{M}_n$) of at least 1000, and having, at the baking temperature of the powder coating composition a lower surface tension than the surface tension of the copolymer, said flow control agent further being a polymer or copolymer selected from the group consisting of acrylate esters, methacrylate esters and polyethylene or polypropylene glycol esters of fluorinated fatty acids; and
(D) a small weight percent of a catalyst which produces a gel time for the coating composition greater than 1 minute at the baking temperature of the composition.

16. The powder coating composition of claim 15 wherein: said phenolic hydroxy terminated resin is a polyether.

17. The powder coating composition of claim 15 wherein: said phenolic hydroxy terminated resin is a polyether having a molecular weight in the range of 600 to 3000.

18. The powder coating composition of claim 15 wherein: said phenolic hydroxy terminated resin is a polyether produced by reacting one equivalent weight of a diepoxy resin with one and a half to three equivalent weights of a diphenol.

19. The powder coating composition of claim 15 wherein: said phenolic hydroxy terminated resin is a polyether produced by reacting one equivalent weight of a diepoxy resin having a molecular weight in the range from about 250 to about 2000 with one and a half to three equivalent weight of a diphenol having a molecular weight from about 110 to about 550.

20. The powder coating composition of claim 15 wherein: said copolymer has a glass transition temperature in the range of 50° C. to 80° C. and a molecular weight ($\overline{M}_n$) in the range of 3000 to 6500, said glycidyl methacrylate being present in said copolymer from at least 10% by weight to no more than 25% by weight.

21. The powder coating composition of claim 15 wherein: said copolymer has a glass transition temperature in the range of 50° C. to 70° C. and a molecular weight ($\overline{M}_n$) in the range of 3000 to 4000, said glycidyl methacrylate being present in said copolymer from at least 12% by weight to no more than 20% by weight.

22. A powder coating composition comprising a mixture of:
(A) a copolymer of glycidyl methacrylate or glycidyl acrylate and an ethylenically unsaturated compound in such proportions as to obtain a copolymer with a glass transition temperature in the range of 40° C. to 90° C. and a molecular weight ($\overline{M}_n$) in the range of 2500 to 8500, said glycidyl methacrylate or glycidyl acrylate being present in the copolymer from at least about 8% by weight to no more than about 30% by weight;
(B) a phenolic hydroxy resin in the amount of 0.8 to 1.1 phenolic hydroxy groups for each epoxy group in the copolymer;
(C) a flow control agent forming at least 0.05% to 4.0% by weight of the mixture, said flow control agent being a polymer having a molecular weight ($\overline{M}_n$) of at least 1000, and having, at the baking temperature of the powder coating composition, a lower surface tension than the surface tension of the copolymer, said flow control agent being a polymer or copolymer selected from the group consisting of acrylate esters, methacrylate esters and polyethylene or polypropylene glycol esters of fluorinated fatty acids; and
(D) a small weight percent of a catalyst which produces a gel time for the coating composition greater than 1 minute at the baking temperature of the composition.

References Cited

UNITED STATES PATENTS

| | | | |
|---|---|---|---|
| 3,222,419 | 12/1965 | Jubilee | 260—836 |
| 3,070,564 | 12/1962 | Roeser | 260—836 |
| 3,297,621 | 1/1967 | Taft | 260—836 |
| 3,247,285 | 4/1966 | Belanger | 260—836 |
| 3,423,481 | 1/1969 | Mizutani | 260—836 |
| 3,595,944 | 7/1971 | Manning | 260—836 |
| 3,652,476 | 3/1972 | Fellers | 260—830 TW |

PAUL LIEBERMAN, Primary Examiner

U.S. Cl. X.R.

117—124 E, 132 BE; 260—37 Ep, 41 B, 41 C, 830 R, 830 TW, DIG. 16, 17 & 19